United States Patent [19]

Pettijohn et al.

[11] Patent Number: 5,066,739

[45] Date of Patent: Nov. 19, 1991

[54] OLEFIN POLYMERIZATION WITH CYCLOPENTADIENYL LANTHANIDEALKYL OF HYDRIDE IN PRESENCE OF HYDROGEN

[75] Inventors: Ted M. Pettijohn; Henry L. Hsieh, both of Bartlesville, Okla.

[73] Assignee: Phillips Petroleum Company, Bartlesville, Okla.

[21] Appl. No.: 560,652

[22] Filed: Jul. 30, 1990

[51] Int. Cl.$^5$ ............................ C08F 4/52; C08F 10/02
[52] U.S. Cl. ..................................... 526/127; 526/126; 526/160; 526/170; 526/352; 526/905; 502/152
[58] Field of Search ............... 526/160, 170, 905, 127, 526/126, 352

[56] References Cited

U.S. PATENT DOCUMENTS 4,665,046  5/1987  Campbell, Jr. ...................... 502/102
4,716,257  12/1987  Marks et al. ........................ 585/275

OTHER PUBLICATIONS

J. Am. Chem. Soc., Thompson et al. (1987), pp. 203–219.
Pure Applied Chemistry, Thompson and Bercaw, 56, 1–11 (1984).
J.C.S. Chem. Comm., Ballard et al., pp. 994–995 (1978).
ACS Symposium Series, Watson et al., 212 (1983) pp. 459–479.

*Primary Examiner*—Fred Teskin
*Attorney, Agent, or Firm*—Edward L. Bowman

[57] ABSTRACT

A process for polymerizing olefins using a catalyst comprising an organolanthanide compound is disclosed wherein the active lifetime of the catalyst is increased by the employment of hydrogen during the polymerization.

13 Claims, No Drawings

5,066,739

OLEFIN POLYMERIZATION WITH CYCLOPENTADIENYL LANTHANIDEALKYL OF HYDRIDE IN PRESENCE OF HYDROGEN

FIELD OF THE INVENTION

The present invention relates to the polymerization of olefins. In a particular aspect the present invention relates to olefin polymerization employing a catalyst comprising a lanthanide metal compound.

BACKGROUND OF THE INVENTION

It is well known that olefins such as ethylene, propylene, and 1-butene can be polymerized in the presence of certain metallic catalysts, particularly the reaction products of organometallic compounds and transition metal compounds to form substantially linear polymers of relatively high molecular weight. Typically such polymerizations are carried out at relatively low temperatures and pressure.

It has been proposed to use certain organolanthanide compounds as olefin polymerization catalysts. Ballard et al in *J.C.S. Chem. Comm.*, pages 994 and 995 (1978) reported that certain alkyl bridged complexes of lanthanide metals such as $[(C_5H_5)_2ErCH_3]_2$ and $[(C_5H_4R)_2YCH_3]_2$, would polymerize ethylene. In addition, Thompson and Bercaw in *Pure and Applied Chemistry*, Vol. 56, No. 1, pages 1-11 (1984), disclose that alkyl and hydride derivatives of permethylscandocene could polymerize ethylene. Although these catalysts were active in polymerizing ethylene, their activity was very short lived. Accordingly it was not possible to obtain particularly desirable levels of catalyst productivity using such catalysts.

An object of the present invention is to provide a method for improving the activity of certain organolanthanide alkyl or hydride catalysts.

Another object of the present invention is to provide a process for polymerizing olefins using organolanthanide compounds.

Other aspects, objects, and advantages of the present invention will be apparent to those skilled in the art having the benefit of the present disclosure.

SUMMARY OF THE INVENTION

In accordance with the present invention there is provided a process for polymerizing an olefin comprising contacting the olefin under suitable reaction conditions with a cyclopentadienyl lanthanide alkyl or hydride in the presence of hydrogen wherein the hydrogen is employed in an amount sufficient to increase the effective lifetime of the catalyst.

DETAILED DESCRIPTION OF THE INVENTION

The cyclopentadienyl lanthanide compounds employed in the present invention are selected from compounds of the formula $Cp_2MR$ wherein Cp is cyclopentadienyl or a substituted cyclopentadienyl, M is selected from scandium, yttrium and metals having atomic numbers in the range of 57 to 71, and R is selected from hydrogen, alkyl radicals having 1 to 12 carbon atoms, alkaryl radicals having 7 to 12 carbon atoms, aryl radicals containing 6 to 12 carbon atoms, and aralkyl radicals containing 7 to 12 carbon atoms. Some specific examples of the Cp groups include cyclopentadienyl, ethylcyclopentadienyl, trimethylcyclopentadienyl, trimethylsilylcyclopentadienyl, and pentamethylcyclopentadienyl. Generally the substituents of the substituted cyclopentadienyl would have 1 to 4 carbon atoms. Typical examples of the R groups include methyl, ethyl, butyl, phenyl, tolyl, and benzyl.

In a preferred embodiment of the present invention a cyclopentadienyl lanthanide halide is combined with an alkali or alkaline earth metal alkyl and the resulting composition is employed in the polymerization of the olefin while hydrogen is added as necessary to increase the effective lifetime of the resulting catalyst. Particularly preferred cyclopentadienyl lanthanide halides are those of the formula CpMX wherein Cp and M are as defined above, and X is a halide, preferably Cl or I. Examples of suitable metal alkyl compounds include methyllithium, ethyllithium, butyllithium, butylmagnesium, ethylmagnesium, and the like. Typically the alkyl group would be selected from those containing 1 to 12 carbon atoms.

When the polymerization is conducted by combining the cyclopentadienyl lanthanide halide and the alkali or alkaline earth metal halide, the ratio of the organolanthanide compound to the alkali or alkaline earth metal compound can vary over a wide range depending upon the particular compounds employed and the particular results desired. As a general rule, the molar ratio of the alkali or alkaline earth metal alkyl to the organolanthanide compound will be in the range of from about 0.5:1 to about 20:1, more commonly about 1:1 to about 15:1.

The present invention is particularly effective in polymerizing ethylene. It is also, however, within the scope of the present invention to employ other olefinic monomers. Examples of other such monomers include propylene, 4-methyl-1-pentene, butadiene, styrene, 1-hexene, 1-butene, propylene, and allyl trimethylsilane. Surprisingly, it has been found that comonomers which would generally result in ethylene polymers of lower density with transition metal catalysts result in polymers of higher density ethylene polymers.

The polymerizations can be carried out in either a solution or a slurry type technique. Conventional polymerization diluents can be used in combination with the catalyst. Some typical examples include aromatic and aliphatic hydrocarbons such as toluene, xylene, hexane, isobutane, ethylbenzene, heptane, decylene, cyclohexane, and mineral spirits.

The amount of hydrogen employed can vary over a wide range depending upon the particular compounds employed in the catalyst and the particular results desired. Typically, the hydrogen would be employed at a pressure in the range of from about 10 to about 200 psi or more, preferably about 15 to about 100 psi.

The temperature employed in the polymerization can also vary over a wide range depending upon the particular results desired. Generally the polymerization temperature would be within the range of about 0° to about 170° C., more preferably about 15° C. to about 100° C.

A further understanding of the present invention and its benefits will be provided by the following examples.

EXAMPLE I

Runs Using a Pentamethylcyclopentadienyl Scandium Compound

Some experiments were conducted to evaluate the effects of various pentamethylcyclopentadienyl scandium compounds on the polymerization of ethylene. The typical polymerization conditions employed included using isobutane as a solvent in the amount of 2 liters and ethylene pressure of 300 psi. Pentamethylcyclopentadienyl will be referred to herein as Cp*. First an attempt was made to polymerize ethylene using Cp*$_2$ScCl without any additional component. No polyethylene was produced. An attempt was made to repeat this polymerization but using in addition hydrogen. Here again no polyethylene was produced.

When Cp*$_2$ScCl was combined with butyllithium and employed in the polymerization of ethylene in the absence of hydrogen the catalyst activity was short lived, lasting only about 5 minutes. Accordingly the productivity of the catalyst was 89 grams of polymer per gram of Cp*$_2$ScCl/hr. The polymerization temperature was 100° C.

A series of runs were then made using the Cp*$_2$ScCl/butyllithium catalyst system using different levels of hydrogen. The variables and results are summarized in Table 1.

TABLE 1

| | Cp*$_2$ScCl/LiBu | |
|---|---|---|
| Hydrogen (psi) | Productivity (g/g · h) | Molecular Weight |
| 0[b] | 89 | UHMW[a] |
| 10[b] | 360 | UHMW |
| 20[b] | 2,000 | UHMW |
| 100[c] | 29,000 | UHMW |

[a]UHMW = Ultra High Molecular Weight.
[b]Run Temperature = 100° C.
[c]Run Temperature = 80° C.

The data in Table 1 illustrates that the hydrogen can have a significant effect upon the active life of the catalyst. Whereas in most transition metal olefin polymerization catalyst systems, hydrogen is used as a method of controlling the molecular weight of the polymer and generally results in a decrease in catalyst activity, in this system, the hydrogen not only promotes catalyst activity but has no significant effect on the molecular weight of the polymer. The polymers produced were all ultra high molecular weight polymers. A similar ultra high molecular weight polymer was produced even when 200 psi of hydrogen was employed in still another polymerization run using the Cp*$_2$ScCl/butyllithium catalyst system.

Still another series of runs were carried out using a catalyst system resulting from Cp*$_2$ScCl in combination with butyllithium. In these runs the polymerization was conducted at 80° C. and a hydrogen partial pressure of 100 psi. The molar ratio of the butyllithium to the scandium compound was varied. The results are summarized in Table 2.

TABLE 2

| | Cp*$_2$ScCl/LiBu |
|---|---|
| Sc:LiBu | Productivity (g/g · h) |
| 5.1:1.0 | 0 |
| 3.7:1.0 | 0 |
| 1.8:1.0 | 0 |
| 1.0:1.3 | 3,100 |
| 1.0:2.7 | 19,000 |
| 1.0:7.4 | 18,500 |
| 1.0:12.7 | 21,000 |

The results indicate that the polymerization activity of the scandium catalyst is somewhat sensitive to the scandium/lithium mole ratio. Generally a relative mole ratio of lithium to scandium of about 2.5:1 is sufficient to obtain a relatively high productivity.

EXAMPLE II

A series of polymerizations were conducted to evaluate the effect of Cp*$_2$YCl complexed with tetrahydrofuran as a catalyst. The Cp*$_2$YCl(THF) was prepared by reacting pentamethylcyclopentadiene with sodium hydride by refluxing in tetrahydrofuran (THF). The resulting cyclopentadienyl sodium compound was then reacted with yttrium trichloride with the molar ratio of the sodium cyclopentadienyl to the yttrium trichloride being 2:1. This reaction was carried out by refluxing in THF. The Cp*$_2$YCl(THF) was obtained by crystallizing the resulting reaction mixture using toluene. The variables, polymerization conditions, and results obtained are summarized in Table 3.

TABLE 3

| Effects of LiBu and Hydrogen on the Activation of Cp*$_2$YCl(THF)[a] | | |
|---|---|---|
| LiBu[b] | Hydrogen[c] | Productivity (g/g · h) |
| No | No | 0 |
| No | Yes | 0 |
| Yes | No | 290 |
| Yes | Yes | 1500 |

[a]90° C., 300 psi C$_2$H$_4$, 60 min.
[b]Y:LiBu = 1:2
[c]100 psi H$_2$.

The data in Table 3 reveals that Cp*$_2$YCl(THF) requires the employment of the lithium alkyl before any significant activity is obtained. The use of hydrogen without the lithium alkyl did not result in an active catalyst. The use of hydrogen with the lithium alkyl provided a catalyst which was significantly higher in productivity. In another series of polymerization runs the pentamethylcyclopentadienyl yttrium THF complex/lithium alkyl catalyst was evaluated at various hydrogen pressures. The results are summarized in Table 4.

TABLE 4

| | Effects of Hydrogen Cp*$_2$YCl(THF)/LiBu | |
|---|---|---|
| Hydrogen (psi) | Productivity (g/g · h) | Molecular Weight |
| 0 | 290 | Low (Wax) |
| 5 | 550 | Low (Wax) |
| 15 | 830 | Low (Wax) |
| 100 | 1450 | Low (Wax) |

Run Temperature = 90° C., 300 psi C$_2$H$_4$.

The data in Table 4 illustrates that increasing the hydrogen pressure increases the productivity, i.e. the active life of the catalyst system. The polymers obtained with this particular catalyst were low molecular weight wax type polymers. Further experiments reveal that one could increase the molecular weight of the polyethylene obtained by using lower polymerization temperatures. Temperatures in the range of 18° C. to 90° C. were employed. The characteristics of the polymers obtained at the different polymerization temperatures is summarized in Table 5.

TABLE 5

| Temperature Dependence Cp*$_2$YCl(THF)/LiBu[a] | | |
|---|---|---|
| Temperature (°C.) | MI | HLMI |
| 18 | 0 | 0 |
| 60 | 0 | 0.52 |
| 65 | 10.7 | 295 |
| 70 | 317 | High* |
| 80 | 33.8 | High |

TABLE 5-continued

| Temperature Dependence Cp*$_2$YCl(THF)/LiBu[a] | | |
|---|---|---|
| Temperature (°C.) | MI | HLMI |
| 90 | High | High |

[a]No hydrogen used.
*The word High as used in the tables indicates that the MI or HLMI was too high to record. Such polymers would generally be termed waxes.

The molar ratio of lithium alkyl to yttrium complex in these runs was about 2:1.

EXAMPLE III

A series of polymerization runs were conducted employing (Cp*$_2$YCl)$_2$. The (Cp*$_2$YCl)$_2$ was prepared by refluxing yttrium trichloride and pentamethylcyclopentadienyl sodium in THF and subjecting the resulting solid to sublimation at 230° C. The molar ratio of the yttrium trichloride to the sodium Cp* compound was 1:2.

A series of polymerization runs were conducted using the (Cp*$_2$YCl)$_2$ with butyllithium to polymerize ethylene. The variations in the polymerization processes and the results obtained are summarized in Table 6.

TABLE 6

| Effects of Hydrogen (Cp*$_2$YCl)$_2$/LiBu | | | |
|---|---|---|---|
| Hydrogen (psi) | Productivity (g/g · h) | MI | HLMI |
| 0 | 1,875 | 0.04 | 1.10 |
| 20 | 1,251 | 43.1 | High |
| 100 | 2,957 | High | High |

Run Temperature = 80° C. Y:li = 1:20

Again it was noted that the employment of hydrogen increases the life of the catalyst system. The results obtained using 20 psi hydrogen are considered anomalous. For this catalyst system the melt index increased as the amount of hydrogen employed increased.

Another series of ethylene polymerization runs were carried out using the butyllithium/(Cp*$_2$YCl)$_2$ catalyst system using different levels of the yttrium compound and lithium alkyl. In these runs no hydrogen was employed. The results and process variables are summarized in Table 7.

TABLE 7

| Effects of Y:LiBu Ratio[a] (Cp*$_2$YCl)$_2$/LiBu | |
|---|---|
| Y:LiBu | Productivity (g/g · h) |
| 1:2 | 40,000[b] |
| 1:5 | 40,000[b] |
| 1:10 | 18,000[c] |
| 1:15 | 15,000[c] |
| 1:20 | 1,000[c] |

[a]90° C., no H$_2$.
[b]50ΔP(C$_2$H$_4$).
[c]200ΔP(C$_2$H$_4$).

These results demonstrate that the productivity is higher when the ratio of Li to Y is higher.

Still another series of polymerization runs were carried out using the butyllithium/(Cp*$_2$YCl)$_2$ catalyst system. In these runs various polymerization temperatures were employed and no hydrogen was used. The results are summarized in Table 8.

TABLE 8

| Temperature Dependence[a] (Cp*$_2$YCl)$_2$/LiBu | | |
|---|---|---|
| Temperature (°C.) | MI | HLMI |
| 60 | 0 | 0 |
| 70 | 0 | 0 |
| 80 | 0.04 | 1.10 |
| 90 | 2.06 | 47.8 |
| 100 | 46.1 | High |

[a]No hydrogen.

The results demonstrate that higher temperatures tend to favor the production of lower molecular weight polyethylenes.

That which is claimed is:

1. A process for polymerizing ethylene comprising contacting ethylene under suitable reaction conditions with a catalyst comprising a catalytic amount of at least one compound of the formula Cp$_2$MR wherein Cp is cyclopentadienyl or cyclopentadienyl substituted with an alkyl or an alkyl silyl radical, M is a metal selected from scandium, yttrium, and metals having atomic numbers in the range of 57 to 71, and R is selected from hydrogen, alkyl radicals having 1 to 12 carbon atoms, aralkyl radicals having 7 to 12 carbon atoms, aryl radicals containing 6 to 12 carbon atoms, and alkaryl radicals containing 7 to 12 carbon atoms, said polymerization being carried out in the presence of hydrogen in an amount sufficient to increase the active lifetime of the catalyst.

2. A process according to claim 1 wherein said catalyst is prepared in situ by combining a compound of the formula Cp$_2$MCl and an alkali or alkaline earth metal alkyl compound.

3. A method according to claim 2 wherein said compound of the formula Cp$_2$MCl is reacted with butyllithium.

4. A process according to claim 3 wherein the molar ratio of the butyllithium to the compound of the formula Cp$_2$MCl is in the range of from about 1:1 to about 15:1.

5. A process according to claim 4 wherein a compound of the formula Cp$_2$ScCl is reacted with butyllithium.

6. A method according to claim 5 wherein said compound of the formula Cp$_2$ScCl consists essentially of dipentamethylcyclopentadienyl scandium chloride.

7. A method according to claim 6 wherein said polymerization is conducted in the presence of at least one additional olefin selected from the group consisting of 1-hexene, propylene, butadiene, 1-butene and 4-methyl-1-pentene.

8. A process according to claim 6 wherein the molar ratio of butyllithium to Cp$_2$ScCl is at least about 2.5:1.

9. A process according to claim 1 wherein said catalyst is prepared in situ by reacting butyllithium with a compound of the formula Cp$_2$YCl(THF), wherein the molar ratio of the butyllithium to the compound of the formula Cp$_2$YCl(THF) is in the range of from about 1:1 to about 15:1.

10. A process according to claim 9 wherein butyllithium is reacted with dipentamethylcyclopentadienyl yttrium chloride.(THF).

11. A process according to claim 10 wherein said polymerization is conducted in the presence of at least one additional olefin selected from the group consisting of 1-hexene, propylene, butadiene, 1-butene, and 4-methyl-1-pentene.

12. A process according to claim 1 wherein said catalyst is prepared in situ by reacting butyllithium with a compound of the formula $(Cp^*_2YCl)_2$, wherein $Cp^*$ is pentamethylcyclopentadienyl and wherein the molar ratio of the butyllithium to the compound of the formula $(Cp^*_2YCl)_2$ is in the range of from about 1:1 to about 15:1.

13. A process according to claim 12 wherein the polymerization is conducted in the presence of at least one other olefin selected from the group consisting of 1-hexene, propylene, butadiene, 1-butene, and 4-methyl-1-pentene.

* * * * *

UNITED STATES PATENT AND TRADEMARK OFFICE
CERTIFICATE OF CORRECTION

PATENT NO. : 5,066,739

DATED : November 19, 1991

INVENTOR(S) : Ted M. Pettijohn, Henry L. Hsieh, and Brian K. Conroy

It is certified that error appears in the above-identified patent and that said Letters Patent is hereby corrected as shown below:

On the title page, Item [75]: "Inventors", please add the following inventor, ---Brian K. Conroy, Batavia, Illinois---.

Signed and Sealed this

Twenty-seventh Day of April, 1993

*Attest:*

MICHAEL K. KIRK

*Attesting Officer*     *Acting Commissioner of Patents and Trademarks*